Patented July 7, 1953

2,644,830

UNITED STATES PATENT OFFICE 2,644,830

VANILLIMINO ETHYL ETHER AND ITS SALTS OF ANHYDROUS ACIDS

Irwin A. Pearl, Appleton, Wis., assignor, by mesne assignments, to Sulphite Products Corporation, Appleton, Wis., a corporation of Wisconsin No Drawing. Application March 22, 1951,
Serial No. 217,074

5 Claims. (Cl. 260—453)

The present invention relates to an improved process for producing ethyl vanillate and to the novel products produced by the process of the invention.

The ethyl vanillate has been prepared heretofore by several different processes. Many of these processes are satisfactory to produce ethyl vanillate of high purity, but some of them have not been entirely satisfactory for the production of a substantially pure compound with minimum difficulty and high yield. Therefore, the principal object of the present invention is to provide an improved process for making ethyl vanillate. Additional objects of the present invention will become apparent through reference to the following description.

I have discovered that ethyl vanillate of high purity may be easily produced from vanillin by first producing a vanillimino ethyl ether from vanillin oxime which has been made from vanillin. An acid salt of the vanillimino ethyl ether is then hydrolyzed to produce ethyl vanillate. A process of this type is illustrated generally by the following formulas.

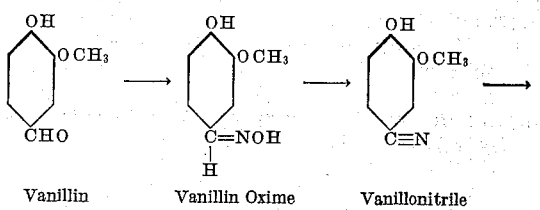

Vanillin    Vanillin Oxime    Vanillonitrile

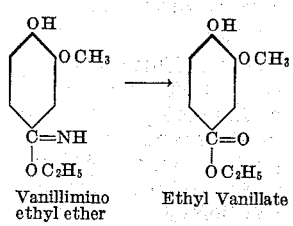

Vanillimino ethyl ether    Ethyl Vanillate

In general, ethyl vanillate may be prepared in accordance with my improved process by first reacting vanillin with a neutralized solution of a salt of hydroxylamine such as the hydrochloride, sulfate, or acid sulfate salts, which are readily available articles of commerce. Vanillin oxime, which results from this reaction, is converted to vanillonitrile by dehydrating the oxime with a suitable dehydrating agent. A particularly good dehydrating agent for this purpose has been found to be acetic anhydride but other dehydrating agents, as for example, propionic anhydride, phosphorous pentoxide, and thionyl chloride may be used. When acetic anhydride is used to dehydrate the vanillin oxime, an intermediate product, acetyl vanillonitrile, is formed. This intermediate product may be selectively hydrolyzed with an acid to produce vanillonitrile.

In order to convert the vanillonitrile to a vanillimino ethyl ether, the vanillonitrile is reacted with ethanol in the presence of an excess of an anhydrous acid while preventing nitration and demethylation, so that the vanillimino ethyl ether, a novel intermediary product, can be isolated as the acid addition salt. Gaseous hydrochloric acid is most advantageously employed as the anhydrous acid, however, other acids, both organic and inorganic, may be used, as for example, sulfuric, hydrobromic, hydrofluoric, and toluenesulfonic acids without causing nitration or demethylation. A nitrating acid such as nitric acid will result in a greatly decreased yield as will demethylating acids such as hydroiodic acid.

The vanillimino ethyl ether acid salt, resulting from the above reaction may be isolated or it may be immediately hydrolyzed, preferably in a neutral or slightly acidic solution (at a pH between about 5 and about 7) to produce ethyl vanillate. The resulting ethyl vanillate is light in color and of unusually high purity.

The following illustrative examples will show various of the preferred procedures for carrying out my improved process.

EXAMPLE I

*Vanillimino ethyl ether and its acid salts*

Vanillimino ethyl ether and its acid salts may be prepared from vanillin by dissolving 45.6 parts by weight of vanillin in a hot solution of 14.4 parts by weight of sodium hydroxide and 180 parts by weight of water. Then 25.1 parts by weight of hydroxylamine hydrochloride is added to the resulting solution, with stirring, and the mixture is allowed to stand. An oil separates immediately from the mixture and gradually changes to white crystals. The crystals are filtered from the solution, washed with water, and dried, providing 51 parts by weight, a 100 per cent yield of pure vanillin oxime which melts at 120–121° C.

The vanillin oxime is dehydrated by first changing it to acetyl vanillonitrile. This may be accomplished by boiling 50 parts by weight of vanillin oxime which is dissolved in 160 parts by weight of acetic anhydride under reflux for one hour. The refluxed mixture, after cooling somewhat, is poured into 700 parts by weight of crushed ice and water with vigorous stirring, and the stirring is continued for a short time. The solution of crushed ice and refluxed mixture is allowed to stand until the temperature of the solution reaches room temperature. Crystals of acetyl vanillonitrile are formed in suspension and the solution is filtered to recover the acetyl vanillonitrile. The filtered product is washed with a minimum amount of water and the product is dried at 60° C. After drying, 60 parts of impure acetyl vanillonitrile results, but through one recrystallization from water 57 parts by weight (100 per cent yield) of substantially pure acetyl vanillonitrile melting at around 103° C. is provided.

The acetyl vanillonitrile is hydrolyzed to vanillonitrile by dissolving 48 parts by weight of the acetyl vanillonitrile in 150 parts by weight of concentrated hydrochloric acid at between 60 and 70° C., the solution being immediately cooled. The cooled mixture is poured into 1,000 parts by weight of water, and produces a cloudy solution which is neutralized with dilute sodium hydroxide solution to a pH of from about 4 to 5. The mixture is then cooled and the precipitate which is formed is separated by filtration. The separated precipitate is then washed with water and dried in air. The resultant product is 27½ parts by weight of vanillonitrile melting at 87° C. (A yield of 75 per cent.)

Vanillimino ethyl ether may be prepared as the hydrochloric acid salt from the vanillonitrile of the preceding step in the process by combining 99 parts by weight of vanillonitrile, which has been dissolved in 350 parts by weight of absolute ether (serving only as a solvent) at room temperature, with 35 parts by weight of absolute ethanol. The resulting solution is cooled in an ice bath and saturated with hydrogen chloride gas, the saturated solution being allowed to stand at room temperature for five days while protected from moisture by a calcium chloride tube. After standing at room temperature for the extended period, the vanillimino ethyl ether separated out as the hydrochloric acid salt and this product is recovered by filtering, washing with ether, and drying in air. One hundred fifty three parts by weight of the product results which amounts to a 93 per cent yield from the vanillonitrile. The product, crude vanillimino ethyl ether hydrochloride is crystalline and melts at 159–160° C. The crude vanillimino ethyl ether hydrochloride is purified by solvating it in anhydrous methanol and precipitation with ether, thereby providing pure vanillimino ethyl ether hydrochloride as a crystalline white powder which melts at 166–167° C.

EXAMPLE II

Ethyl vanillate

Ethyl vanillate may be obtained by preparing a solution comprising 88 parts by weight of the crude vanillimino ethyl ether hydrochloride, produced in Example I, and 650 parts by weight of water. The solution is boiled under reflux for 30 minutes to hydrolyze the imino ether and a light yellow oil separates out from the clear solution. The oil is extracted from the solution with ethyl ether and the ether is removed by distillation. After removal of the ether, 69 parts by weight of ethyl vanillate remains, representing a 94 per cent yield on the basis of the vanillimino ethyl ether hydrochloride. The ethyl vanillate is yellowish in color and melts at 42–43° C. The ethyl vanillate, which is substantially pure, could be further purified by distillation under reduced pressure to yield over 96 per cent of pure, colorless ethyl vanillate melting at 43° C.

EXAMPLE III

Ethyl vanillate

Ethyl vanillate is also produced by adding a seed crystal of ethyl vanillate to the refluxed mixture of vanillimino ethyl ether hydrochloride and water from Example II. The precipitate, ethyl vanillate, is directly filtered out. When this process is employed, the yield of ethyl vanillate is somewhat less, because of the solubility in water of ethyl vanillate.

EXAMPLE IV

Vanillimino ethyl ether hydrobromic acid salt

The hydrobromic acid salt of vanillimino ethyl ether is prepared by following the procedure of Example I except that the solution of vanillonitrile and absolute ether is reacted with 35 parts by weight of ethanol and the resulting solution is cooled in an ice bath and saturated with gaseous hydrogen bromide. This saturated solution is allowed to stand at room temperature for five days protected from moisture by a calcium chloride tube. By following this procedure the vanillimino ethyl ether separates from the solution as the hydrobromic acid salt which salt may be recovered by filtering, washing in ether, and drying in air. The resulting salt may be hydrolyzed to provide ethyl vanillate.

EXAMPLE V

Vanillimino ethyl ether hydrofluoric acid salt

The hydrofluoric acid salt of vanillimino ethyl ether is prepared by following the procedure of Example I except that the solution of vanillonitrile and absolute ether is reacted with 35 parts by weight of ethanol and the resulting solution is cooled in an ice bath and saturated with gaseous hydrogen fluoride. The saturated solution is allowed to stand at room temperature for five days protected from moisture by a calcium chloride tube. When this procedure is followed the vanillimino ethyl ether separates from the solution as the hydrofluoric acid salt which is recovered by filtering, washing in ether, and drying in air. The hydrofluoric acid salt may be hydrolyzed to produce ethyl vanillate.

EXAMPLE VI

The sulfuric acid addition salt of vanillimino ethyl ether

The sulfuric acid addition salt of vanillimino ethyl ether is prepared by following the procedure of Example I except that the solution of vanillonitrile and absolute ether is reacted with 35 parts by weight of absolute ethanol and the resulting solution is cooled in an ice bath. To this solution there is added 98 parts by weight of anhydrous sulfuric acid for each 100 parts by weight of vanillonitrile. The solution is allowed to stand at room temperature for five days protected from moisture by a calcium chloride tube. In this case the vanillimino ethyl ether separates from the solution as the sulfuric acid addition salt of vanillimino ethyl ether and this product may be recovered by filtering, washing in ether, and drying in air.

EXAMPLE VII

Vanillimino ethyl ether toluenesulphonate

The acid addition salt of vanillimino ethyl ether and toluenesulphonic acid is prepared by following the procedure outlined in Example VI, except that 130 parts by weight of toluenesulfonic acid is substituted for the 38 parts by weight of anhydrous sulfuric acid employed in that example.

In the foregoing there is disclosed an improved process producing ethyl vanillate. In addition, there is disclosed a manner of producing new products which are useful as an intermediate in the production of ethyl vanillate.

Various features of the invention are set forth in the appended claims.

I claim:

1. A product selected from the class consisting of vanillimino ethyl ether and its salts of anhydrous acids.
2. The product vanillimino ethyl ether hydrochloride.
3. The product vanillimino ethyl ether hydrobromide.
4. The product vanillimino ethyl ether hydrofluoride.
5. The sulfuric acid addition salt of vanillimino ethyl ether.

IRWIN A. PEARL.

References Cited in the file of this patent

Brady et al.—Chem. Abstracts—vol. 9—(1915), page 205.

Vavon et al.—Chem. Abstracts—vol. 32—(1938), page 2507.

Raiford et al.—Chem. Abstracts—vol. 34—(1940), page 3249.

Degering—An Outline of Org. N. Cpds. (1945), pages 176, 188, 538.